United States Patent
McKee (10) Patent No.: US 10,848,991 B2
(45) Date of Patent: Nov. 24, 2020

(54) SENSOR NETWORK (71) Applicant: BRITISH TELECOMMUNICATIONS PUBLIC LIMITED COMPANY, London (GB)

(72) Inventor: Paul Francis McKee, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/105,112

(22) PCT Filed: Dec. 17, 2014

(86) PCT No.: PCT/GB2014/053731
§ 371 (c)(1),
(2) Date: Jun. 16, 2016

(87) PCT Pub. No.: WO2015/092395
PCT Pub. Date: Jun. 25, 2015

(65) Prior Publication Data
US 2017/0026858 A1    Jan. 26, 2017

(30) Foreign Application Priority Data
Dec. 17, 2013 (EP) .................................... 13250124

(51) Int. Cl.
*H04W 24/04* (2009.01)
*H04W 4/70* (2018.01)
(Continued)

(52) U.S. Cl.
CPC ............ *H04W 24/04* (2013.01); *G06F 21/50* (2013.01); *H04L 47/24* (2013.01); *H04L 67/12* (2013.01);
(Continued)

(58) Field of Classification Search
CPC ...... H04W 24/04; H04W 4/005; H04W 84/18; H04L 47/24; H04L 67/12; H04L 67/322
See application file for complete search history.

(56) References Cited

U.S. PATENT DOCUMENTS

| | | | |
|---|---|---|---|
| 2004/0046651 A1* | 3/2004 | Norimatsu | B60C 23/0445 340/445 |
| 2005/0086243 A1 | 4/2005 | Abbott et al. | |

(Continued)

FOREIGN PATENT DOCUMENTS

| | | |
|---|---|---|
| EP | 1 513 300 A2 | 3/2005 |
| EP | 1 876 776 A2 | 1/2008 |

OTHER PUBLICATIONS

International Search Report dated Feb. 16, 2015 issued in International Application No. PCT/GB2014/053731.
(Continued)

*Primary Examiner* — Jae Y Lee
(74) *Attorney, Agent, or Firm* — Nixon & Vanderhye PC (57) ABSTRACT

A loss of connection between a wireless access point and a network is reported to a network-based service platform by the wireless access point by automatically establishing wireless contact with a second wireless access point, and transmits a predetermined fault report message to a predetermined network platform address by way of the second wireless access point and the second network interface. Authentication credentials are stored in the access point allowing automatic access to the service platform without user intervention, to allow the report to be generated without user intervention. The message may include data on recent usage of the access point, or may be repeated when a user attempts to use the access point, in order to prioritise the fault reported at the service platform.

4 Claims, 8 Drawing Sheets (51) Int. Cl.
*H04L 12/851* (2013.01)
*H04L 29/08* (2006.01)
*G06F 21/50* (2013.01)
*H04W 84/18* (2009.01)

(52) U.S. Cl.
CPC ............ *H04L 67/322* (2013.01); *H04W 4/70* (2018.02); *G06F 2221/2101* (2013.01); *G06F 2221/2115* (2013.01); *H04W 84/18* (2013.01)

(56) References Cited

U.S. PATENT DOCUMENTS

| | | | |
|---|---|---|---|
| 2006/0064384 A1* | 3/2006 | Mehrotra | G01S 3/7864 705/57 |
| 2008/0071899 A1 | 3/2008 | Odaka et al. | |
| 2009/0125918 A1 | 5/2009 | Kansal et al. | |
| 2009/0271529 A1* | 10/2009 | Kashiyama | G06F 16/2455 710/1 |
| 2010/0106982 A1 | 4/2010 | Castelli et al. | |
| 2010/0211359 A1 | 8/2010 | Neelesh | |
| 2011/0078758 A1 | 3/2011 | Kohlenberg et al. | |
| 2011/0119523 A1 | 5/2011 | Bisdikian et al. | |
| 2012/0197852 A1 | 8/2012 | Dutta et al. | |
| 2012/0197911 A1 | 8/2012 | Banka et al. | |
| 2014/0222813 A1* | 8/2014 | Yang | G06F 16/95 707/736 |
| 2015/0080044 A1* | 3/2015 | McHenry | H04W 16/14 455/515 |
| 2015/0135258 A1* | 5/2015 | Smith | G06F 21/45 726/1 |
| 2015/0146942 A1* | 5/2015 | Abe | G06K 9/00013 382/124 |

OTHER PUBLICATIONS

Hull, et al., "CarTel: a distributed mobile sensor computing system", Proceedings of the Fourth International Conference on Embedded Networked Sensor Systems (SENSYS), Oct. 31, 2006, (14 pages).
G. Cardone et al., "Fostering participation in smart cities: a geo-social crowdsensing platform," in *IEEE Communications Magazine*, vol. 51, No. 6, pp. 112-119, Jun. 2013 (8 pgs.).
Subramaniam et al., "Online Outlier Detection in Sensor Data Using Non-Parametric Models", *VLDB '06*, Sep. 12-15, 2006, Seoul, Korea (12 pgs.).
Jain et al, "Network Imprecision: A New Consistency Metric for Scalable Monitoring", $8^{th}$ USENIX Symposium on Operating System Design and Implementation, Dec. 2009 (16 pgs.) https://www.usenix.org/legacy/events/osdi08/tech/full_papers/jain/jain.pdf.
L. Filipponi et al., "Smart City: An Event Driven Architecture for Monitoring Public Spaces with Heterogeneous Sensors," *2010 Fourth International Conference on Sensor Technologies and Applications*, Venice, 2010, pp. 281-286 (6 pgs.).
Banerjee et al., "'What affects me?' a smart public alert system based on stream reasoning", ICUIMC, Jan. 17-19, 2013 (10 pgs.).
Invitation pursuant to Rule 63(1) EPC dated May 8, 2014 issued in EP Application No. 13250124.8 (4 pgs.).
Andrew S. Tanenbaum et al., "Computer Networks", fifth edition, pp. 456-461 (3 pgs.).
Extended European Search Report dated Jul. 4, 2014 issued in EP Application No. 13250124.8 (7 pgs.).
Ramanathan et al., "Prioritized epidemic routing for opportunistic networks" in Proceedings of the 1st international MobiSys workshop on Mobile opportunistic networking (MobiOpp '07) San Juan, Puerto Rico, USA, Jun. 11, 2007, 62-66 (5 pgs.).
Sheth et al., "Semantic Sensor Web," in *IEEE Internet Computing*, vol. 12, No. 4, pp. 78-83, Jul.-Aug. 2008 (6 pgs.).
EP14816362.9—European Patent Office Examination Report dated Feb. 27, 2020 (4 pgs.).
Request for Comments: 3198, "Terminology for Policy-Based Management", A. Westerinen et al, Nov. 2001 (21 pgs.).

* cited by examiner

SENSOR NETWORK

This application is the U.S. national phase of International Application No. PCT/GB2014/053731 filed 17 Dec. 2014, which designated the U.S. and claims priority to EP Patent Application No. 13250124.8 filed 17 Dec. 2013, the entire contents of each of which are hereby incorporated by reference.

FIELD OF INVENTION

The invention relates to a method of operating an event data processor in a sensor network. It has particular utility to processing events indicated by simple sensors in sensor networks.

BACKGROUND OF INVENTION

Sensor networks enable people and systems to monitor environmental conditions and to perform certain actions based on the received information. A sensor network comprises a plurality of sensors placed at different geographical locations. The early sensor networks comprised fairly advanced sensors; however, the trend nowadays is to deploy simpler sensors in order to reduce the cost and complexity of systems as well as prolonging sensor battery life. These simple sensors have limited communication support and have no access to any time synchronisation protocols such as NTP (Network Time Protocol); they normally broadcast sensed data autonomously with no external control and they can all have different owners.

One example implementation of sensor networks is the so called Smart City. In the Smart City different sensors such as temperature sensors, humidity sensors, position sensors, movement sensors etc. are deployed to measure parameters of interest. One way of efficiently using the information received from the Smart City sensor network is to implement an event-driven architecture governed by policies. One such system is described in "Smart City: an event driven architecture for monitoring public spaces with heterogeneous sensors", Filipponi et al, published at the 2010 Fourth International Conference on Sensor Technologies and Applications. This policy-based management system comprises an event manager which processes data received from the sensors in order to detect certain conditions and if necessary generate warning or alert events.

Many sensor networks assume a request response model to gather data from the deployed sensors. This is convenient when the sensors belong to one owner and where more advanced sensors are used. However, when simple sensors which push sensor data are used, an event manager cannot request data but instead has to wait for the sensor to send the data.

In some applications ad-hoc networks are used to distribute information from sensors to the intended recipients of that information. Because ad-hoc sensor networks use the sensors themselves to relay information towards its destination, there is a need to use the available communications resources sparingly. Thus, in order to focus the resources of ad-hoc networks on messages carrying useful information, ad-hoc network routing protocols have been proposed which take account of the usefulness of the data contained within a message to be routed. For example, a paper entitled 'Prioritized Epidemic Routing for Opportunistic Networks', presented by Ram Ramanathan and others at MobiOp '07, describes a routing protocol for use in so-called opportunistic networks. The routing protocol prioritises or drops messages in dependence upon four inputs, namely the number of hops to the destination of the message, the number of hops already traversed by the message, the expiry time of the message, and the generation time of the message.

Another example of an ad-hoc network routing protocol which takes account of the usefulness of the data contained within a message to be routed is found in European Patent 1 876 776. That patent discloses a routing protocol for use in a vehicle ad-hoc network. An application running on a source node (often housed in a vehicle) provides a specification of its information dissemination needs in the form of a utility function. The node is provided with relevance and distance metrics which depend upon statistical vehicle flow in the neighbourhood of the node, and the predicted utility of data to hypothetical vehicles in the vicinity of the node. When the application sends an individual data sample, the node assigns a so-called microutility to the sample based on a plan devised automatically from the utility function, relevance, and distance metrics. Other nodes which receive the message can then evaluate the microutility function in order to determine how to handle the message. The value of the microutility function can depend on the time and place of its evaluation. Depending on the calculated microutility, the node might decide to propagate the message, delay it, or drop it.

The downside of such routing protocols is that the network provider or sensor operator determines what information about the state of the system an event consumer sees. In an event-driven system where the event consumer reacts to the state of the system as reported to it, the manner in which the event consumer reacts to the state of the system thus undesirably depends upon the routing protocol rather than depending upon the state of the system.

US patent application 2012/0197911 discloses a sensor network based on simple sensors where the sensors upload their readings to an aggregator. The aggregator timestamps the data and in certain cases also associates a geographical location with the received data.

SUMMARY OF INVENTION

According to a first aspect of the invention there is provided a method of operating a data event processor in a sensor network, said method comprising: receiving a plurality of data events from an event generator, performing an analysis of said plurality of events to determine a relevance indicator for at least one of said data events, associating said relevance indicator with said at least one data event, and providing said data event in association with said relevance indicator to an event consumer.

By receiving a plurality of events from an event generator, labelling at least one of those events with a relevance indication determined on the basis of said plurality of events, and providing an event consumer with the event data along with the indication of its relevance, the event consumer is able to react to the relevance of the event data in a manner specific to the event consumer.

In some embodiments, the analysis involves exploring changes or the lack of changes in the data provided from the event generator.

According to a second aspect of the present invention there is provided method of operating an event consumer, said method comprising: receiving an event from an event generator, collecting additional event data from a data event processor operated in accordance with the method of claim 1, wherein the event data has associated therewith a relevance indicator, and initiating a reaction to the event which depends upon both the event data and the relevance data associated with that event data.

Event consumers initiate a reaction to the state of a system or environment in a manner which depends upon the event data provided to them. By operating an event consumer to react to an event in a manner which depends upon both the event data itself, and relevance data associated with the event data, the event consumer is able to carry out a better informed reaction to the state of the system or environment.

In some embodiments, the reaction comprises determining whether to delay any reaction to the event until further event data is provided.

By determining a relevance indicator for the data, and determining whether to delay execution of an action based on the relevance indicator more accurate and efficient actions can be triggered.

Preferably, the relevance indicator is determined from temporal characteristics of the event data. The temporal characteristics of the data can be for example the age of the event data or a time interval until the event data generator will generate a new data event. Preferably, a reliability of the data is determined from the rate of change of the data and/or by comparing the event data received from the data event generator to event data received from neighbouring data event generators or a combination of the two.

According to a third aspect of the present invention there is provided a data event processor for use in a sensor network, said data event processor comprising one or more interfaces arranged in operation to receive a plurality of data events from an event generator, a module arranged to perform an analysis of said plurality of events to determine a relevance indicator for a data event and to associate said relevance indicator with said data event, and an output arranged in operation to provide said data event and said associated relevance indicator to an event consumer.

According to a fourth aspect of the present invention there is provided an event consumer arranged to initiate an action based on an event, said event consumer comprising one or more interfaces arranged to receive an event from an event generator, a data collection module arranged to collect additional event data from a data event processor according to the third aspect of the present invention, wherein the event data has associated therewith a relevance indicator, and a module arranged to determine whether to delay execution of the action in dependence upon said relevance indicator.

BRIEF DESCRIPTION OF THE DRAWINGS

Embodiments of the invention will now be described, by way of example, with reference to the accompanying drawings in which.

DETAILED DESCRIPTION OF INVENTION

The present invention is preferably implemented in a policy based management system for large scale distributed systems where there is no single point of control and numerous parties can generate management policies. Such policies are triggered by observed events, which may originate from event generators, such as sensors. Before a management action can be triggered conditional statements or clauses for the policies have to be evaluated. The conditional clauses identify resources, e.g. sensors or parameters, whose values require checking to fully evaluate the decision tree leading to the correct action.

Figure 1:
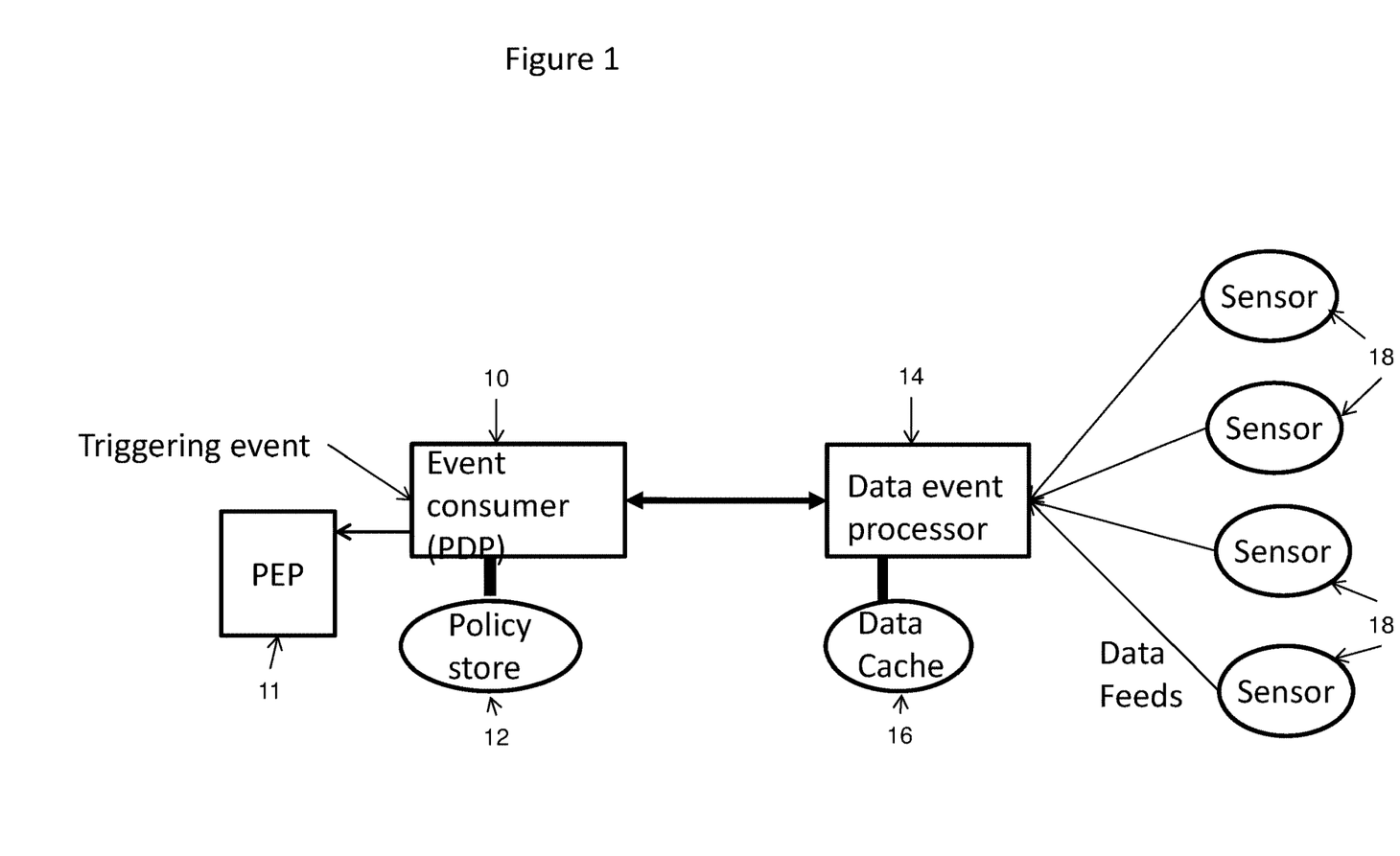
FIG. 1 shows the components of a system for policy-based event management

FIG. 1 shows such a policy based event management system. The system comprises event generators or sensors 18, a data event processor 14, a data cache 16 associated with the data event processor 14, an event consumer 10, hereafter referred to as a policy decision point (PDP), a policy execution point (PEP) 11 and a policy store 12. The system can comprise a plurality of data event processors, each gathering data from a number of sensors, and a plurality of PDPs 10 and PEPs 11.

Figure 2A:
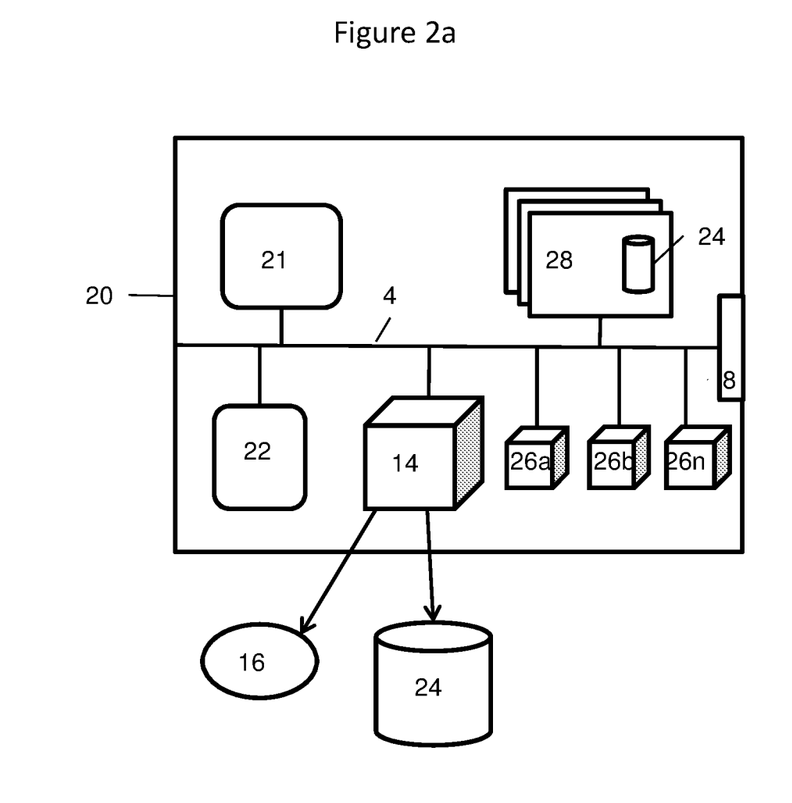
FIG. 2 shows the components of an data event processor server implemented in the system
Figure 2B:
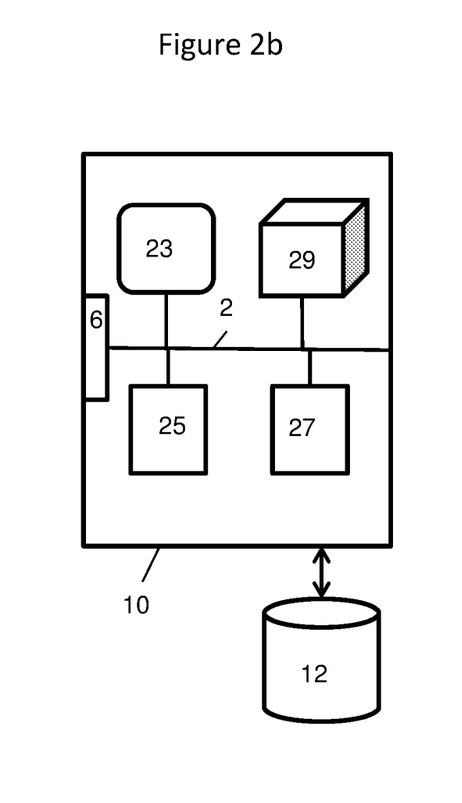

Referring to FIG. 2b, the PDP 10 comprises a network interface 6 for communication with other nodes in the network and also for connection via telecommunications link to some or all event data generators (sensors) in the network; a bus 2; a central processing unit (CPU) 23; one or more memories 25; one or more stores 27; and one or more program modules 29 which when loaded into the memory 25 and executed by the CPU 23 performs policy based event management. Examples of the program modules 29 are a data collection module which collects data events from one or more data event processors; and a data relevance indicator evaluation module which evaluates the relevance of collected data and based on said indicated relevance determines whether to delay execution of an action.

The PDP receive triggering events from sensors which are programmed to send a triggering event to the PDP 10 upon sensing a particular event. A triggering event can be that a measured sensor value breaches a threshold value. If very simple sensors are used, sending data values only when a threshold is breached also serves as a power saving option. Depending on network configurations and available communication links the triggering event can go straight to the PDP 10 in order to achieve near real time automated management or it might pass through a data event processor, but would be unprocessed by said processor. The triggering data event might also pass through gateways to take it from one networking technology to another, such as Wi-Fi or TV white space sensors joining a wired Ethernet network. Hence, although the intent is direct communication between sensor and PDP the reality may involve other intermediaries.

If a sensor or event generator is not programmed to report only sensor values breaching a threshold some other entity in the network has to analyse sensor values to detect the breach. This can be done by the PDP 10, one of the event data processors or a gateway in the network. The analysis would preferably be done as near as possible to the event origin. The analysis, might, for example, be performed at the first transmission point that would allow this, i.e. at the gateway or the event data processor.

Sensors 18 can be associated with environmental monitoring, traffic monitoring etc. and be for example temperature sensors, humidity sensors, particle sensors, movement sensors, gas sensors. Each sensor 18 has limited power and will only send a short message, the time interval for each message will either relate to changes in data, or on some internal timing process of the sensor 18. As a minimum each sensor 18 sends a message comprising an identifier, a measured value and a sequence number to allow detection of any failures or losses in the sensor network. The output from each sensor 18 will be a message with the following structure: (sensor_id, measured_value, sequence_number). The output from a number of sensors 18 will be transmitted to the data event processor 14. The sensors 18 can transmit data wirelessly over different kind of networks such as cellular (3G/4G), Wi-Fi or Bluetooth as well as transmitting data over a wired network.

The sensors 18 may also include mobile sensors, such as may be found in vehicles. These mobile sensors report data to one or more data event processors 14 in a similar way. Sensors in vehicles will have access to more power and additional information such as that provided by a GPS system (Global Positioning System). The reporting period may still be infrequent due to network constraints, but the original data structure could be augmented to include both position and velocity together with direction of travel. The GPS could also provide an accurate time of observation so that the data supplied to the data event processor 14 in this case would be of the form: (sensor_id, sensor_location, sensor_velocity, direction, measured_value, sequence_number, time_captured).

The data event processor 14 will now be described with reference to FIG. 2a. The data event processor 14 is a functional software component or module running on a general purpose computer or server 20 in a network. The data event processor server 20 further comprises interface 8, bus 4, processor 21, synchronised network clock 22 capable of accurate timings, statistical module 26a, a module for generating a relevance indicator 26b for a data event based preferably on the data event and a plurality of data events previously received from the same event generator, and one or more memories 28. The data event processor may optionally comprise other modules 26n such as modules for interpolating or extrapolating data events or predicting data values based on previous data events generated by each sensor. A cache 16 and database 24 is also associated with the data event processor 14; the database 24 is stored in one or more of the memories 28 or in external storage or in a combination of the two.

Figure 7:
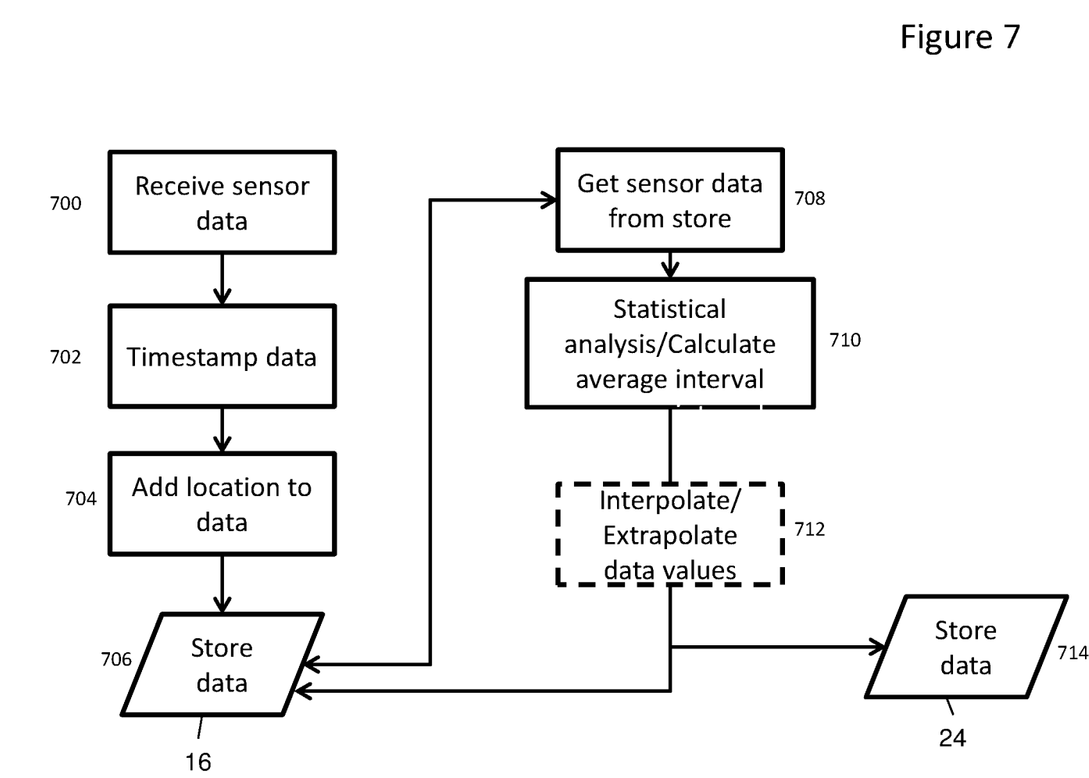
FIG. 7 shows a flow chart of an exemplary process performed by an data event processor.

Referring to FIG. 7, the data event processor 14 receives data readings from a plurality of sensors 18, [700]. When sensor data arrives at the data event processor it is arranged to use the synchronised network clock 22 to timestamp the data with an accurate time of arrival [702]. The data event processor 14 is further optionally arranged to store in the cache 16 or database 24 geographical location data for stationary sensors; the location data for each stationary sensor could for example be registered in the database when the sensor network is deployed. The sensor data can therefore also be augmented by a location for the sensor [704] as well as by a time stamp for time of receipt by the data event processor 14. It is optional whether this replaces the sensor_id or is in addition, having it in addition may have benefits if sensors are reused. The data structure at the data event processor 14 now becomes: (sensor_id, sensor_location, measured_value, sequence_number, time_captured).

The data event processor 14 will hold the sensor values in the cache 16 [706] before they are later on placed in longer term storage, such as the database 24.

Preferably at least the following data is stored for each sensor 18: sensor id; type of sensor; location; and communication mode. Additional data, such as sensor manufacturer, date of installation, status of local software as well as other metadata can also be stored for each sensor. This additional data is mainly required for sensor network management.

As stated the sensor data and sensor values can be stored in either the cache 16 or in longer term storage, such as database 24. Where to store the data depends on how quickly the data needs to be retrieved.

According to an exemplary embodiment of the present invention, again referring to FIG. 7, once the data event processor 14 has collected a significant set of data points from each sensor 18 it retrieves the data points from the cache 16 [708] and instructs the statistical module 26 to perform a statistical analysis of the data points and to calculate an average interval between readings for each sensor [710], which can be recorded with the sensor data structure and stored in either the cache 16 [706] or database 24 [714] as an indicator of its relevance period or time to live. For stationary sensors the sensor data structure would then be: (sensor_id, sensor_location, measured_value, sequence_number, time_captured, ttl). For mobile sensors the sensor data structure would be: (sensor_id, sensor_location, sensor_velocity, direction, measured_value, sequence_number, time_captured, ttl).

Optionally, the data event processor 14 is further arranged to use the statistical record of values and their arrival times to interpolate values of sensor data or extrapolate values if requested to [712].

The data event processor 14 preferably stores this data in its cache 16 and is hence capable of quickly responding to queries and carrying out processing tasks, using its processor 21, on the data it holds.

Figure 8:
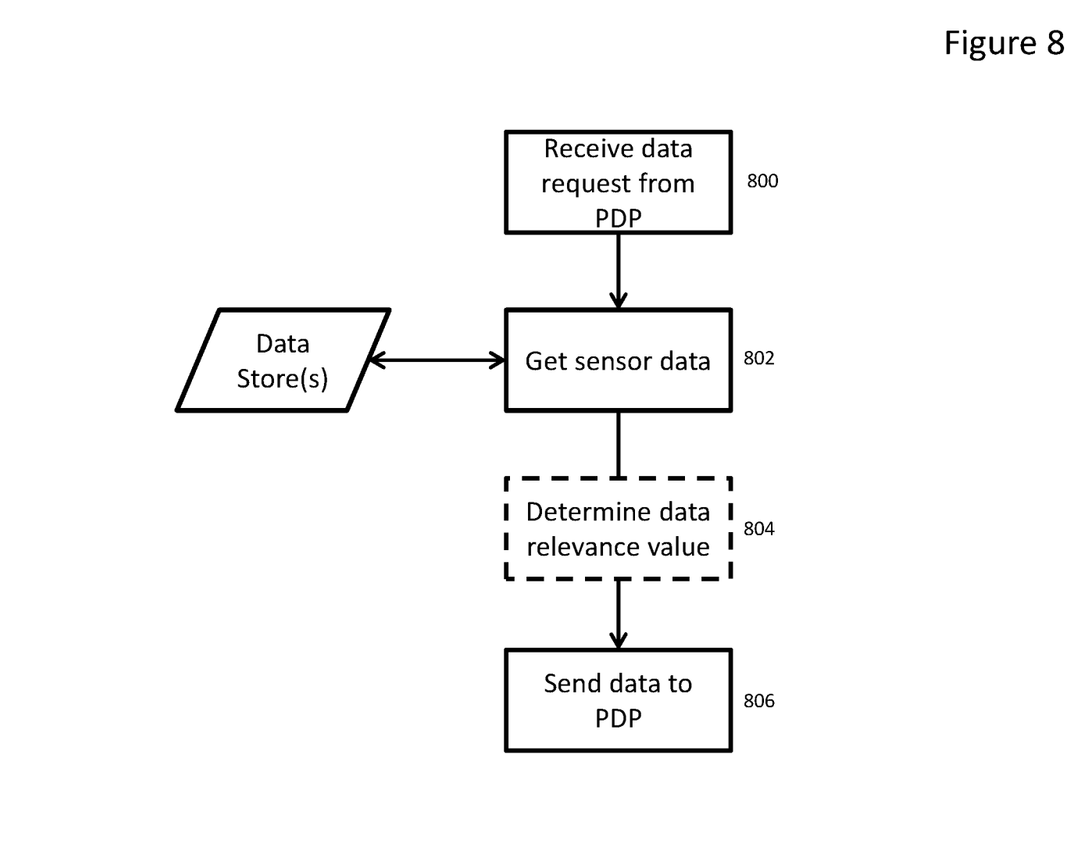
FIG. 8 shows a flow chart of another exemplary process performed by the data event processor.

Referring to FIG. 8, the data event processor 14 is now able to respond to queries from policy decision points (PDPs) 10 in the system. The data event processor receives a request for conditional data from the PDP 10, [800] and collects the relevant data from the cache 16 or database 24, [802].

The data event processor can further be configured to determine and allocate a relevance value or relevance indicator to each data record, [804]. The relevance value is based on any of time characteristics of the data, the location of the sensors providing the data or the reliability of the data or any combinations of the three. The time characteristics can be the age of the data or the time interval till the data will next be updated. Reliability is determined from the rate of change of the data, i.e. the volatility of the data, or by comparing a sensor with its nearest neighbours since it might be possible for one sensor to generate a history of stable but erroneous values that could be highlighted by comparison with suitable neighbours. For example, a dust monitoring sensor could have picked up some enduring contamination and be reporting levels much higher than its neighbours, but doing so in a stable way. Comparing the sensor value to values from neighbouring sensors would give this value a low confidence even if the sensor had reported recently.

The relevance indicator could for example be based on the "time to live" (ttl) value generated by the data event processor server 20. If the "time to live" breaches a threshold and hence the data event is deemed old the relevance indicator determined would indicate low relevance for the data. In another example, if the "rate of change" of a data value for a sensor breaches a threshold the determined relevance indicator could indicate a low relevance for the sensor since this could be caused by a faulty sensor. In other circumstances a determined "rate of change" in combination with a location of the data generator could indicate high relevance of the data event.

The data event processor then sends the data, preferably together with a relevance indicator, to the PDP 10, [806]. Alternatively, the data event processor sends the sensor data as they are to the data requesting PDP 10 where after the PDP 10 itself determines the relevance of the data based on the same criteria.

When triggering events are received by the policy decision point (PDP) 10 all relevant policies in its policy store 12 are selected, and for each selected policy any condition clauses need to be checked. In order to check the condition clauses the PDP 10 is arranged to request sensor data from the data event processor 14, evaluate the data, both the relevance of the data and the actual data values, and based on the result decide whether to trigger certain actions.

The requests and messages can take a number of forms and some examples will now be described: a). In the simplest case where the sensor 18 is known the PDP 10 could request the value of for example the temperature sensor on the roof of specified building. The response from the data event processor 14 would be of the form (value, time collected, time till update). The relevance indicator is here based on the "time till update".

b). The PDP could request data from a location in which case the reply would include a location for each sensor (value, time collected, location, time till update). The relevance indicator is here determined based both on the location of the sensor and the time to update.

c). For simple sensors the returned data could include an average or interpolated result together with some indication of the rate of change of that value over time, (value, time collected, location, interpolation, time till update, rate of change); this might be particularly useful for sensors that report infrequently. The relevance indicator is here based on both location, time till update and rate of change.

d). For geographical areas an average of several sensors in the area could be reported, together with a list of the sensors used and their locations, (calculated_value, list of sensors). The relevance indicator is here based on the reported locations and the number of sensors on which the average is calculated.

A PDP 10 receiving any of the above responses is then configured to determine if the relevance of the data, as preferably indicated by the relevance indicator, is sufficient to execute any actions. If the data event processor does not submit a relevance indicator with the response, the PDP 10 is configured to determine the relevance indicator. If the relevance as indicated by the recency of the data; sensor location; number of sensors, rate of change etc. fulfils the requirements of the PDP 10, it uses the data to determine whether to trigger the relevant actions for the event. If the PDP does not find the data up to date or that sensor data from more sensors or other locations are needed, it is configured to wait for updated data or await data from sensors which will reach the geographical location within a certain time in order to improve the relevance of any actions.

A one-condition based decision to defer an action could be: "If data age is less than 50% of max data age use data, else wait for next data point". A combination of conditions for determining whether to delay an action could for example be: "If data age is less than 50% of max data age and rate of change is less than 10% per interval use data, else wait for next data point."

Figure 3:
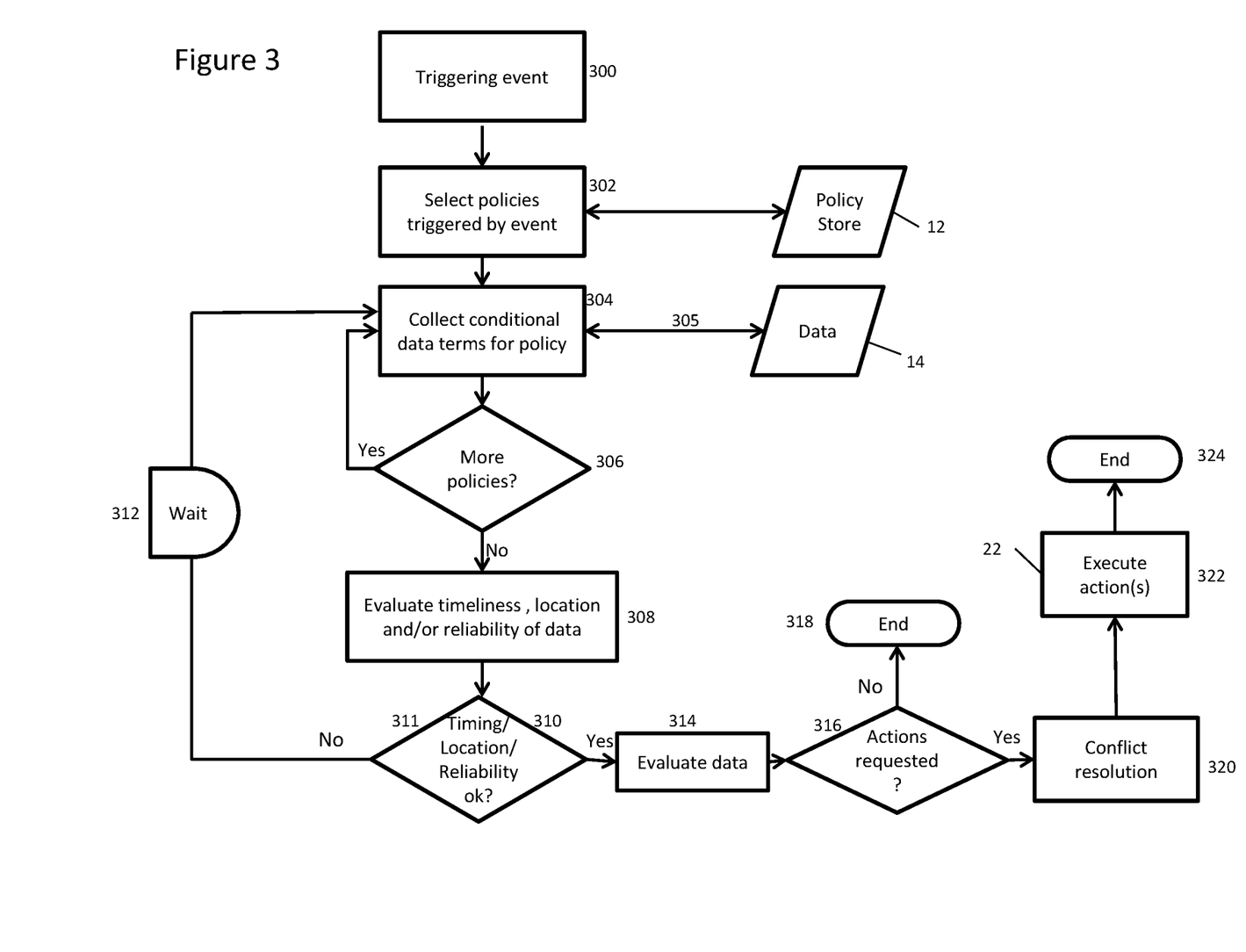
FIG. 3 shows a flow chart of an exemplary process performed by a policy decision point PDP

Referring to FIG. 3 an operational sequence of events for any of the scenarios a)-d) above will now be described:
1. Triggering event arrives at PDP 10, [300].
2. PDP 10 queries policy store 12 and retrieves all policies that are triggered by that event [302].
3. For each policy the PDP 10 determines which conditional data it requires [304].
4. The PDP 10 sends a request for the additional data to one or more data event processors 14, which retrieve sensor data relevant to the request and send it back to the PDP 10 [305].
5. The PDP 10 checks if there are more policies to collect additional data for [306]
6. If not, the PDP 10 evaluates the conditional statements on the policies [308]:

If the data meets the location, timeliness and/or reliability constraints [310] the PDP 10 will evaluate the data to determine if an action should be executed [316]. If not, the process ends [318]. If a policy action is to be executed, the policy will optionally be checked for any conflicts with other policies [320] where after the policy action is sent to a policy execution point (PEP) 11 to cause a remedial management action to take place in response to the triggering event [322]. The process thereafter ends [324].

If the data fails to meet the timing, location and/or reliability constraints [311], the PDP 10 is configured to not evaluate the data further but to wait or delay the process for a time [312] and to resubmit the requests to the data event processors 14 [304], [305] in order to collect more recent sensor data or data from other sensors, whereafter this new data is evaluated [308] and the correct action to take is resolved.

This sequence of operation is quite different from the traditional event-condition-action (ECA) policy in the context evaluation area. In a simple ECA policy operating according to the state of the art the sequence of operation is:
1. Check if triggering event has been observed
2. Evaluate conditional statements
3. Execute result of evaluation For policies that allow deferred action based on additional information on location, timing and/or reliability of the data, as in embodiments of the present invention, a general sequence of operation is:
1. Observe triggering event
2. Collect data for condition evaluation from data event processors
3. Evaluate timeliness and location constraints as well as the reliability of the data and determine a relevance indicator for the data.
4. Delay and recollect if necessary
5. Execute result of evaluation The evaluation of timeliness, location and reliability in step 3 can be performed in any order or only one or two of the constraints could be evaluated. In one embodiment the evaluation in step 3 could be:

Check location of sensor to see if in relevant area, otherwise discard data

Check timeliness of data, if time interval exceeded potentially wait for more recent data Check reliability of data—is the range, rate of change and/or comparison with other neighbouring sensors acceptable?

Where only temporal relevance is considered, the request for context from the PDP 10 will receive data back from the data event processors 14 that will be of the form (Sensor_id, data_value, collection_time, predicted_update_time). The collection of time values define a time interval that stretches from the oldest to the newest value. The policy can therefore assess the conditional data against two criteria, namely: is the most recent data point new enough and is the spread of all the data points in time over a small enough range. Failure to meet either of these criteria will force a delay in policy evaluation and a request for new context data. The time of the delay can be evaluated by stepping through the data points for each expected update time, the PDP 10 re-evaluates the time interval and when it is in range waits until that time and requests context data again before evaluating the policy and deciding on a course of action.

A further and slightly more complex embodiment of the proposal could use location data as a constraint; this would be particularly useful when the individual sensors 18 are mobile as in the case of vehicle mounted devices. Data received back from the data event processors 14 would be of the form (Sensor_id, data_value, collection_time, predicted_update_time, position, velocity, direction).

The policy would define an area in geographical terms; either a bounding polygon or a centre point and radius for a circle, in essence any polygon would be suitable. The policy evaluates all of the position points of the context data to determine if they are in the area of interest, the policy may indicate a minimum number of sensors it requires in the area to determine a course of action. If the threshold is not reached the velocity and direction data can be used to look for a future time when sufficient sensors will have moved into the area of interest, the policy will delay until then and repeat the request for context data. In more complex scenarios the time and location constraints may be used in one policy.

An example implementation considering a traffic network in a "smart city" with an automated advisory sign 46 that informs drivers as to the best route (A or B) to reach the city centre will now be described with reference to FIGS. 4, 5 and 6.

Figure 4:
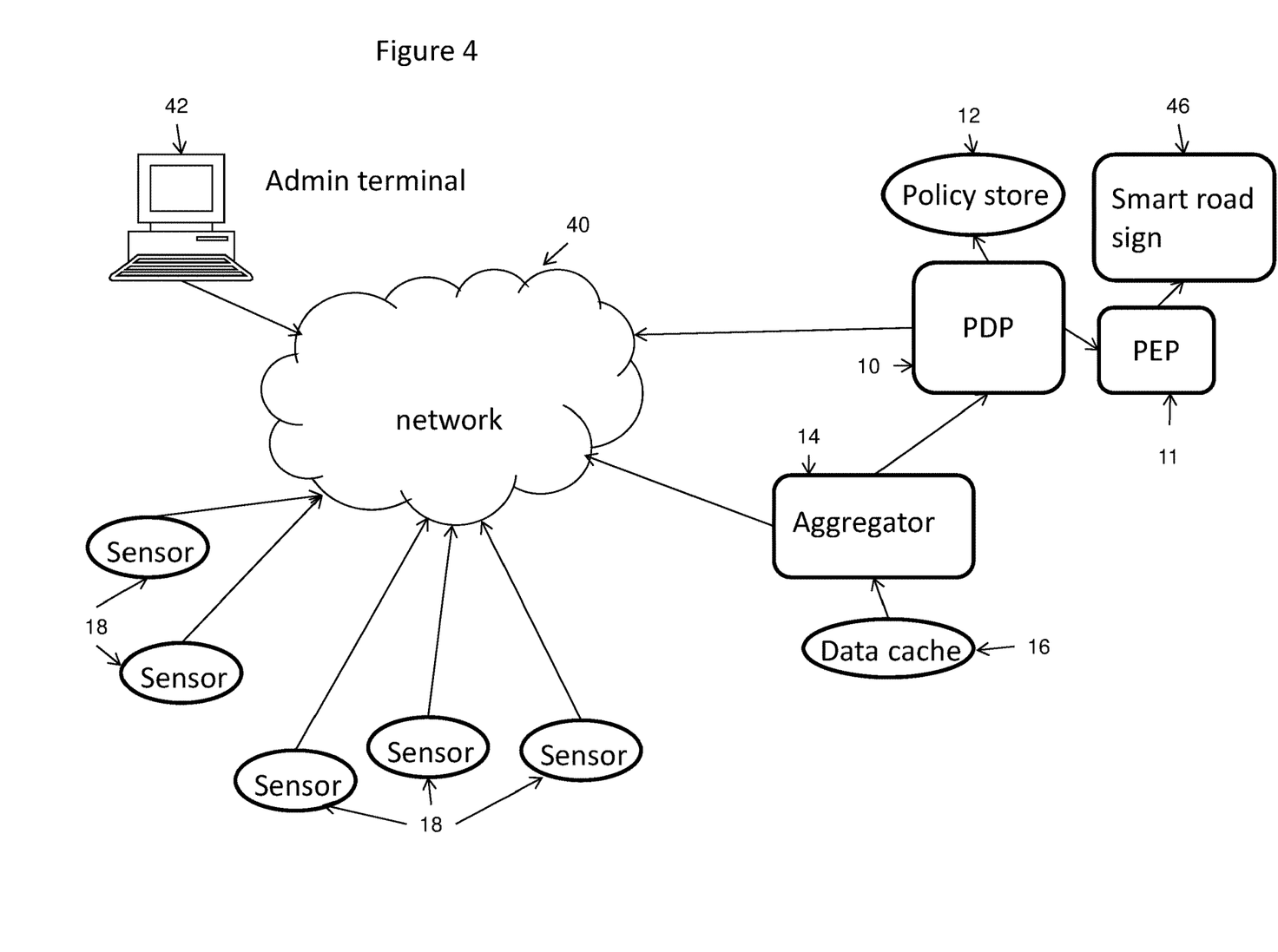
FIG. 4 shows a system diagram for an example scenario.

FIG. 4 shows the sensor network 40 which observes traffic flows in a road network using sensors 18, for example cameras. Based on events triggered by the cameras 18 the PDP 10 retrieves relevant policies from the policy store 12 and requests conditional data from the data event processor 14. The PDP is configured to determine timeliness and location constraints for the data according to embodiments of the present invention, in order to more accurately direct the traffic via the smart road sign 46.

Figure 5:
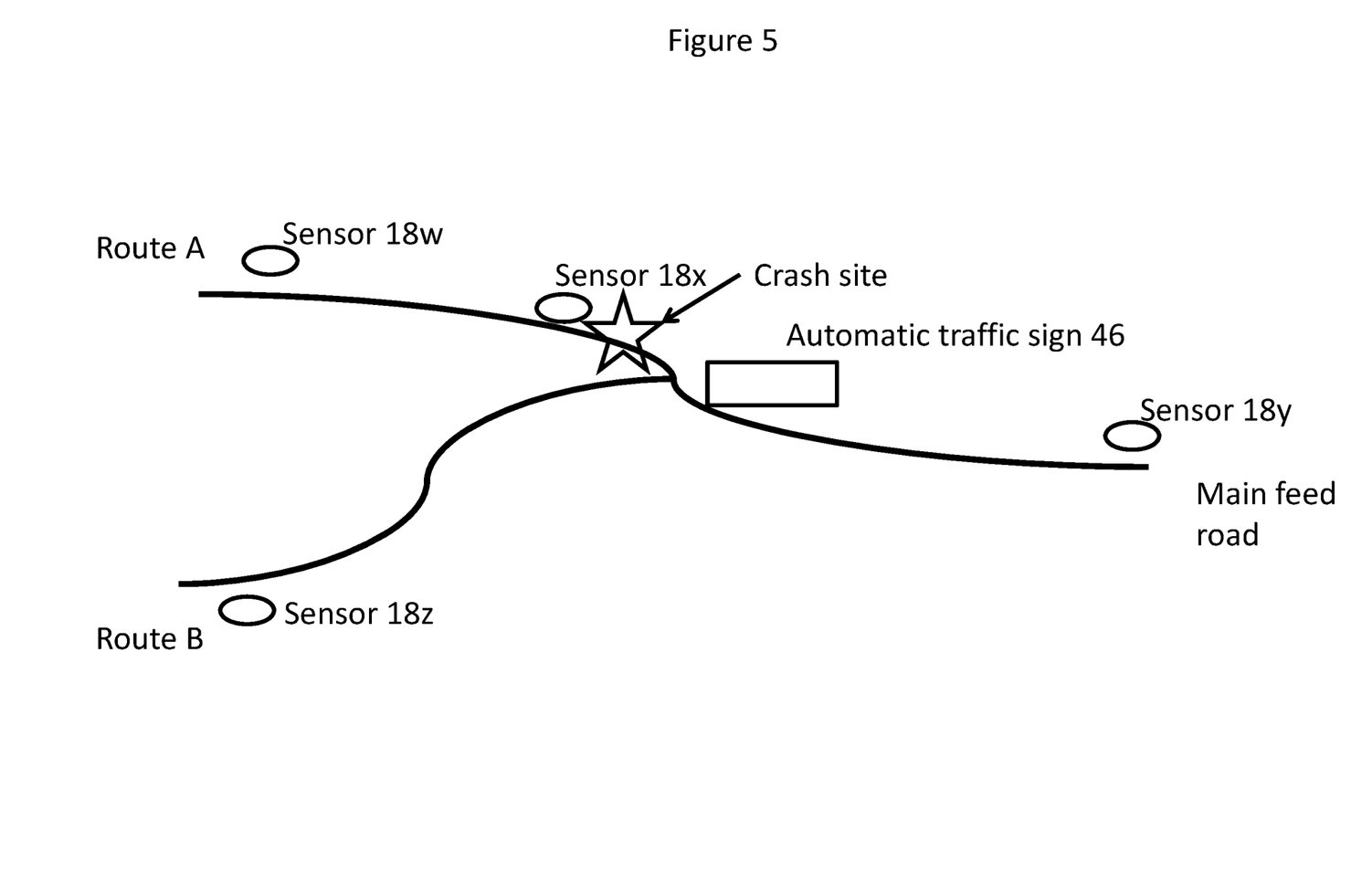
FIG. 5 shows the example scenario of FIG. 4.

Referring now to FIG. 5, the roads are monitored by traffic sensors (18w, 18x, 18y and 18z) which report the number of cars passing. The sensors report on an interval of 10 minutes but they are not synchronised so the reports arrive at different times. Assume a scenario in which an accident occurs on route A, effectively blocking the road. Traffic approaching from the main feed road can see the accident on route A and therefore chooses to use route B. Sensor 18z sees an increase in passing traffic and raises an event "route B busy". At this time sensor 18y might be reporting normal traffic as would sensor 18w. Sensor 18x may even report light traffic as the crash cuts the traffic feed. A simple policy might take these inputs and decide to route traffic towards route A, which would increase the congestion. Obviously the quality of any corrective action will be improved by using all the sensors 18, or a selection of important sensors 18; it is for example obvious in this scenario that sensor 18x has more relevant information than sensor 18w. The availability of information from in car sensors would also add to the quality of information available and lead to improved decision making.

Figure 6:
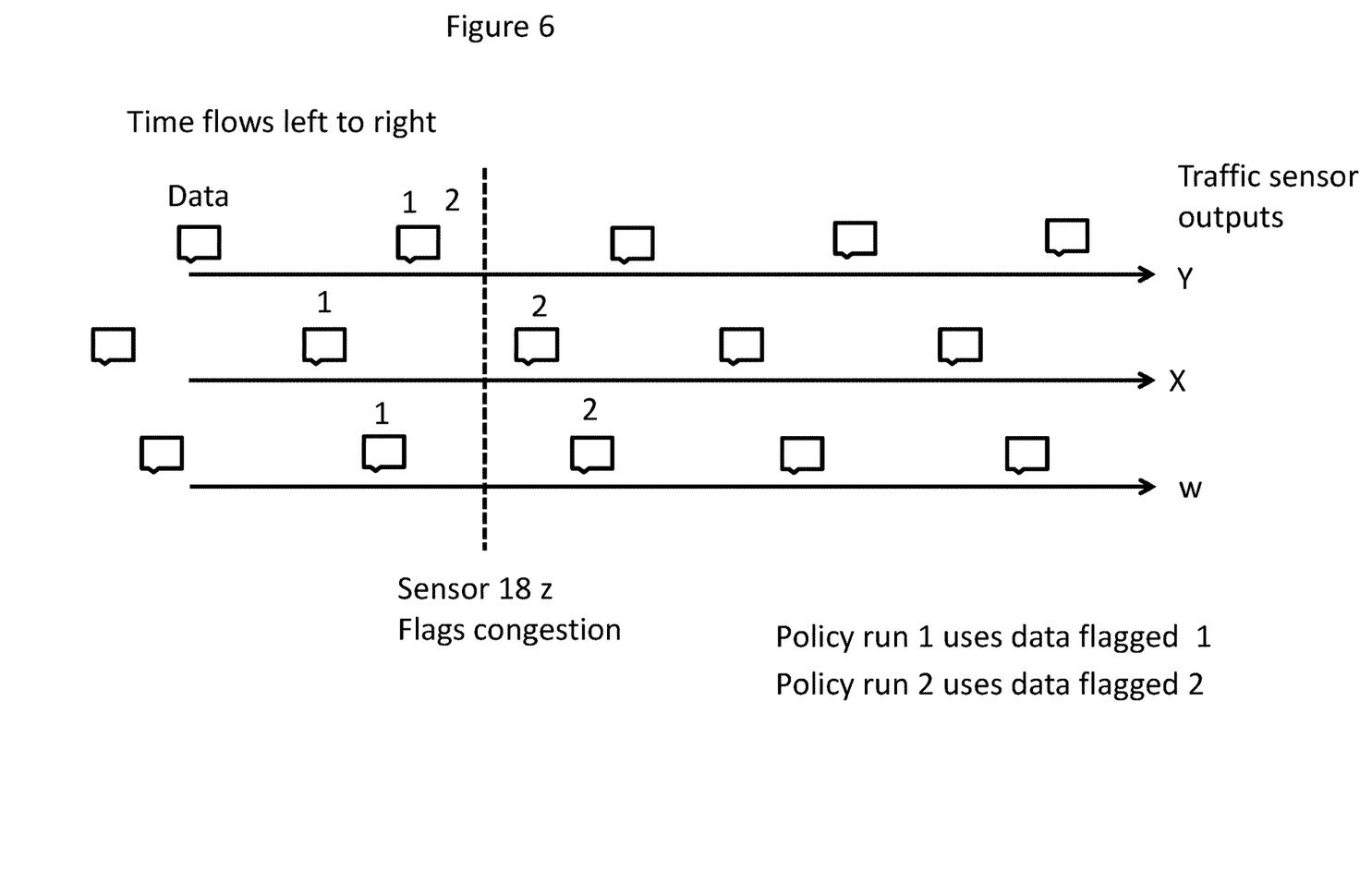
FIG. 6 shows a sequence of events for the example scenario of FIG. 5.

FIG. 6 shows a timeline of the measurements from the traffic sensors 18, i.e. cameras, and it demonstrates how a delayed action policy may lead to improvements in outcome.

In a simple policy scenario according to the state of the art, policy run 1 in FIG. 5, the flow of events and pseudo code would be:

1. Sensor 18z generates an event indicating congestion
2. Evaluate a policy for congestion at z
3. Conditional clause indicates check values from sensors 18w, 18x and 18y
4. If sensors 18w and 18x indicate moving traffic and 18y indicates slow traffic change sign to recommend route A
5. If 18w and 18x indicate slow traffic change sign to indicate general congestion Following this simple policy with the data to hand would result in traffic being directed down route A into the blockage which is less than satisfactory.

A more advanced policy, policy run 2 in FIG. 6, using timing constraints as suggested in examples of the present invention would use the following flow of actions:

1. Sensor 18z at location z generates an event indicating congestion
2. Evaluate a policy for congestion at z
3. Conditional clause indicates check sensor values for sensors 18w, 18x and 18y
4. Timing check: if data age of sensors 18w, 18x or 18y is greater than 50% of sample interval wait for next sample
5. Check sensors 18w, 18x and 18y again and evaluate conditions
6. If sensors 18w and 18x indicate moving traffic and sensor 18y indicate slowly moving traffic change sign to recommend route A
7. If sensors 18w and 18x indicate slowly moving traffic change sign to indicate general congestion
8. If 18w indicates moving or very light traffic and 18x also indicates light traffic this suggests a problem on route A
   a. Alert traffic manager to examine traffic camera at junction
   b. Request actions on route B to re-sequence traffic lights at junctions further into town to speed up flow.

This set of policy data is more closely grouped and contains a more recent measurement from sensor 18x which has a key role in determining the state of the traffic network following the incident.

The general process flow for this policy evaluation is:
1. Observe trigger event
2. Select all policies triggered by that event
3. For each policy
   a. Collect conditional data terms
   b. Evaluate conditional terms timing and location
   c. If relevance testing results in fail, i.e. the relevance indicator indicates a low relevance value,
      i. Wait and recollect conditional term data
      ii. Re-evaluate
   d. If pass
      i. Collect actions
4. Perform conflict resolution if required
5. Execute actions.

In the traffic scenario presented it would be possible to collect speed and direction data from cars equipped with the relevant sensors 18 in the vicinity of the junction or even to request data from cars on the road segment between the junction and the crash site to speed up the condition evaluation and the quality of the response. In this case the conditional clause would include a statement to check mobile sensors 18 in the geographical coordinates of that road segment and the position and speed values returned would indicate stationary traffic and a problem. Vehicle data may be produced more frequently than the 10 minutes assumed for stationary sensors as power consumption is less of an issue and a moving vehicle can cover a reasonable distance in 10 minutes, it is possible that the reporting interval could be speed related.

A further example implementation relates to urban heat islands. An urban heat island is a metropolitan area that is significantly warmer than its surrounding rural areas due to human activities, such as traffic, air conditioning systems, light reflecting glass buildings etc. The increased temperature in combination with sunny weather can lead to the formation of low-level ozone and hence affect the air quality.

A policy-based warning system can alert people in the area if the air quality worsens and/or re-direct traffic from the area in order to improve the air quality. As in the traffic scenario the system uses a plurality of different sensors scattered in the area as a basis for its actions. The sensors can be stationary or mobile and comprise for example temperature sensors, humidity sensors, ozone sensors, and wind speed sensors.

Referring again to FIG. 1, the PDP 10 receives a triggering event from an ozone sensor 18 in the area and selects all policies triggered by the event. One policy could for example state: Reduce traffic to area if ozone level above . . . and wind speed less than . . . and temperature higher than . . . . The PDP 10 therefore requests the data event processor 14 for sensor data from all wind speed sensors 18 and temperature sensors 18 in the area. The PDP 10 then evaluates the timing and location of the data for each sensor in order to determine a relevance indicator for the data. A rule could state that if half of the wind speed sensors and half of the temperature sensors provide data that was recently updated the PDP can base its decision to execute or not execute the action on the received data, which in this case is to reduce or not reduce traffic to the area. If on the other hand a majority of the sensors provide data that is deemed old, the PDP 10 decides to wait until at least half of the sensors have provided new sensor data to the data event processor 14. Since the data event processor 14 has calculated the time to live or time to update for each sensor the PDP 10 can wait until a sufficient number of the sensors are predicted to have sent new data to the data event processor before requesting the sensor data from the data event processor again.

A further policy condition could be that at least half of the sensor data should have updated in the last ten minutes and the range of the readings obtained must be less than 10% of the average value, thus indicating a consistent set of readings unaffected by local sensor variations or failures.

Other statistical tests such as standard deviation could be used to assess the spread of the data: tightly grouped data values would essentially lead to a "better" decision, while too much variation could indicate an unstable environment and prompt waiting for more consistent data.

The rate of change of data could also be considered as a conditional element: if at least 50% of the sensors have reported within the last 5 minutes and the rate of change of any sensor is less than 0.1 degrees per minutes: take an action. Again it provides an assessment of the stability of the environment and an indication that any proposed action could be effective.

In a further example, a high rate of change could be used as an indication of a problem and trigger an action. If an array of temperature sensors were normally active over a range of 12 to 30 degrees and a value of 30 was observed, but the rate of change was possibly several degrees a minute, it could be taken as an early indication of a problem and trigger intervention. As a specific example, a night time temperature of 10 degrees would be rapidly increased by a small fire, for example in a waste bin, but reported values might take time to reach a typical day time value of 30 degrees, however, the rate of change would suggest early action.

Further, policies that use comparison between sets of data from different families of sensors could be used as a basis for delaying decisions. If controlling a distributed manufacturing line, a trigger from a temperature sensor in one part of the process might cause a policy to the check ambient temperature before deciding on a course of action. The course of action could be as simple as open air vents to cool the area if outside temperature is 10 degrees below the interior temperature, and it's not raining, and the amount of dust in the air is below a certain value. This could also be used with pollutant sensors to control smart building ventilation.

Exemplary embodiments of the invention are realised, at least in part, by executable computer program code which may be embodied in application program data provided by program modules 26 and 29 in the respective Data event processor server 20 and Policy Decision Point PDP 10. When such computer program code is loaded into the memory 28 of each device for execution by the respective processors 21, 23 it provides a computer program code structure which is capable of performing at least part of the methods in accordance with the above described exemplary embodiments of the invention.

Furthermore, a person skilled in the art will appreciate that the computer program structure referred can correspond to the process flows shown in FIGS. 3, 7 and 8 where each step of the processes can correspond to at least one line of computer program code and that such, in combination with the processor (CPU) in respective device, provides apparatuses for effecting the described processes.

The above embodiments are to be understood as illustrative examples of the invention. Further embodiments of the invention are envisaged. For example, the modules or part of the modules for effecting the described processes can be implemented in hardware or a combination of hardware and software. The data event processor server 20 and PDP 10 are described as two entities; however, the functions of these servers could be performed by a single server. The evaluation of time and location constraints as well as the reliability of the data [308] and the evaluation of the actual data values [314] could be performed simultaneously in one step instead of as described in FIG. 3 in two steps. The two step approach however has the advantage that data value evaluation is not performed for data not fulfilling the time, location and reliability constraints. The reliability of the data could alternatively be evaluated in box [314], at the same time as the actual data values are evaluated. The data event processor server 20 as described in FIG. 2a comprises a specific module 26b for determining the relevance indicator; however, this could also be performed by the statistical module 26a. In fact, the modules 26a-26n could be one single module 26 performing all the tasks of the statistical module, relevance indicator module and interpolation/extrapolation module.

In summary, embodiments of the present invention relates to a policy-based method and apparatus for managing events detected by data event generators in a network. A data event generator forwards event data to a data event processor in the network. The data event processor is arranged to determine a data relevance indicator for the data event based on a plurality of received data events from the same data event generator. The relevance of the data can depend on for example time characteristics of the data and the location of the data event generator providing the data. An event consumer requests data from data event processor and if the relevance indicator indicates low relevance of the data the event consumer puts execution of any actions on hold, requests newer data from the data event processors when the newer data becomes available and bases the decision on whether to execute any actions on this new data.

The invention claimed is:

1. A method of operating an event consumer, in a sensor network including a sensor readings processor operable to:
 receive a plurality of sensor readings from a sensor,
 derive a relevance indicator for at least one of the sensor readings by performing an analysis of the plurality of sensor readings from the sensor,
 generate an augmented sensor reading by associating said relevance indicator with said at least one sensor reading, and
 provide said augmented sensor reading including said associated relevance indicator to the event consumer, the method comprising:
 receiving one or more augmented sensor readings;
 selecting all policies relevant to the augmented sensor reading;
 evaluating whether the relevance indicator is sufficient to base a decision on whether to react to the at least one sensor reading; and
 in the event that the relevance indicator is sufficient, using the at least one sensor reading to determine whether to trigger any relevant actions;
 in the event that the relevance indicator is not sufficient, obtaining one or more additional augmented sensor readings in accordance with any conditional clauses of the selected policies, each additional augmented sensor reading comprising an additional sensor reading and an additional relevance indicator associated with the additional sensor reading.

2. The method according to claim 1, further comprising:
 evaluating whether the additional relevance indicator associated with the additional sensor reading is sufficient to base a decision on whether to react to the at least one sensor reading; and
 in the event that the additional relevance indicator is sufficient, using the at least one sensor reading to determine whether to trigger any relevant action.

3. An event consumer arranged to initiate an action based on an event, said event consumer comprising:
 a data collection module arranged to:
  collect augmented sensor readings including an associated relevance indicator from a sensor readings processor for use in a sensor network, said sensor readings processor comprising: one or more interfaces arranged in operation to receive a plurality of sensor readings from a sensor; a module arranged to derive the relevance indicator for at least one of the sensor readings by performing an analysis of the plurality of readings from the sensor and to associate said relevance indicator with said sensor reading; and an output arranged in operation to provide an augmented sensor reading including said associated relevance indicator to the event consumer;
  select all policies relevant to the augmented sensor reading
 an evaluation module arranged to evaluate whether the relevance indicator is sufficient to base a decision on whether to react to the at least one sensor reading; and
 a decision module arranged, in the event that the relevance indicator is sufficient, to use the at least one sensor reading to determine whether to trigger any relevant actions;
 wherein said data collection module is further arranged to:
  in the event that the relevance indicator is not sufficient, obtain one or more additional augmented sensor readings in accordance with any conditional clauses of the selected policies, each additional augmented sensor reading comprising an additional sensor reading and an additional relevance indicator associated with the additional sensor reading.

4. An event consumer according to claim 3 wherein:
 the evaluation module is further configured to evaluate whether the additional relevance indicator associated with the additional sensor reading is sufficient to base a decision on whether to react to the at least one sensor reading; and
 the decision module is further configured to, in the event that the additional relevance indicator is sufficient, use the at least one sensor reading to determine whether to trigger any relevant action.

* * * * *